United States Patent [19]

Mashino et al.

[11] Patent Number: 4,831,322
[45] Date of Patent: May 16, 1989

[54] VOLTAGE REGULATOR FOR CHARGER/GENERATOR

[75] Inventors: Keiichi Mashino, Katsuta; Shigekazu Takei, Ibaraki, both of Japan

[73] Assignees: Hitachi Ltd.; Hitachi Automotive Engineering Co., Ltd., both of Tokyo, Japan

[21] Appl. No.: 189,181

[22] Filed: May 2, 1988

[30] Foreign Application Priority Data

May 7, 1987 [JP] Japan ................................ 62-109885
Jul. 13, 1987 [JP] Japan ................................ 62-172939

[51] Int. Cl.⁴ .......................... H02P 9/08; H02P 9/30; H02J 7/24
[52] U.S. Cl. ........................................ 322/28; 320/64; 322/60
[58] Field of Search ........................ 322/28, 60; 320/64

[56] References Cited

U.S. PATENT DOCUMENTS

| | | | |
|---|---|---|---|
| 4,250,444 | 2/1981 | Iwaki et al. | 322/28 |
| 4,266,181 | 5/1981 | Muto et al. | 322/28 |
| 4,293,811 | 10/1981 | Muto et al. | 322/60 |
| 4,385,270 | 5/1983 | Balan et al. | 322/28 X |
| 4,388,587 | 6/1983 | Lamoth et al. | 322/28 X |

FOREIGN PATENT DOCUMENTS

140112 10/1979 Japan .

*Primary Examiner*—R. J. Hickey
*Attorney, Agent, or Firm*—Antonelli, Terry & Wands

[57] ABSTRACT

In a voltage regulator for charger/generator comprising a switching element, connected between a battery and a field winding of a generator adapted to charge the battery, for switching on and off an exciting current flowing through the field winding and a voltage detector responsive to voltage of the battery to control the operation of the switching element, there are provided an oscillator for generating an oscillation signal of a desired duty ratio, an initial excitation signal generator circuit having a plurality of stages of frequency dividers for dividing the frequency of the oscillation signal generated from the oscillator and combining together frequency division signals of the frequency dividers to produce a synthesized output signal of a desired duty ratio, a booster for boosting and rectifying an AC signal containing the oscillation signal of the oscillator and a signal which is opposite in phase to the oscillation signal to produce a boosted output signal, and excitation control means being operative, when the generator is in non-generation condition, to apply the oscillation signal of the oscillator to the booster in synchronism with the output signal of the initial excitation signal generator circuit so as to cause the booster output signal corresponding to the output signal of the initial excitation signal generator circuit to on/off control the switching element to thereby effect initial excitation of the generator and being operative, when the generator is in a predetermined generation condition, to respond to an output signal of the voltage detector so as to control the application of the oscillation signal to the booster to thereby on/off control the switching element in dependence on the battery voltage.

2 Claims, 6 Drawing Sheets

(a) $1/2^N$ FREQUENCY DIVISION SIGNAL (b) $1/2^{N+1}$ FREQUENCY DIVISION SIGNAL (c) SYNTHESIZED

TIME

| | INPUT | | | OUTPUT | |
|---|---|---|---|---|---|
| | CL | D | R | Q | $\overline{Q}$ |
| 501 | X | X | 1 | 0 | 1 |
| 502 | ⎍ | 0 | 0 | 0 | 1 |
| 503 | ⎍ | 1 | 0 | 1 | 0 |
| 504 | ⎎ | X | 0 | Q | $\overline{Q}$ |

VOLTAGE REGULATOR FOR CHARGER/GENERATOR

BACKGROUND OF THE INVENTION

This invention relates to a voltage regulator for charger/generator and more particularly to a semiconductor type voltage regulator suitable for use in a charger/generator driven by an internal combustion engine.

Conventionally, in a so-called IC regulator using a power transistor to switch on and off the exciting current of the generator and particularly in the type in which the power transistor is constantly rendered on beginning with switch-on of the key switch to permit the initial excitation current to be fed from the battery to the field winding of the generator, there arises a problem that because of such an inadvertency that the key switch is left to be turned in during engine stop, the battery is discharged through the field winding within a short period of time, resulting in overdischarge.

In an approach to this problem as proposed in JP-A-54-140112, the power transistor is so controlled as to be turned on and off at a proper duty ratio by an oscillation signal from an oscillator during an interval of time ranging from an instant that the key switch is turned in to an instant that the generator reaches a predetermined generation condition, in order to restrict the initial excitation current.

In the proposal, the oscillator has to be specifically designed for generation of the asymmetric waveform signal and in order to obtain a desired duty ratio (14.3% in the proposal), values of resistor and capacitor included in the oscillator must be adjusted. Conventionally, the voltage regulator for car on-board charger/generator is typically realized with a hybrid thick film integrated circuit and built in the generator and therefore the resistance can typically be adjusted by cutting the thick-film resistor through function trimming process, thus increasing expenditure in manufacture of IC. If a power MOS-FET is used as the switching element to allow the overall voltage regulator to be formed of an inexpensive monolithic IC, it is impossible for the resistance adjustment by trimming to be conducted.

Further, the prior art has the following disadvantage. More particularly, while the power transistor serving as switching element in the conventional IC regulator is in general connected to the low potential side of the field winding, the high potential side thereof is always applied with voltage of the battery. Accordingly, in the event of the presence of salty substance deposited on the generator rotor, leakage current flows from the slip ring adapted to pass current to the field winding on the rotor to the generator housing through the rotor shaft and bearing even when the power transistor is turned off and electrolytic corrosion tends to occur. By connecting the switching element to the high potential side of the field winding, the leakage current may be eliminated but there needs a driver power supply of a higher voltage than the battery voltage, which is difficult to realize with an IC, for driving the switching element.

In another generally known car on-board semi-conductor type voltage regulator as disclosed in, for example, British patent No. 1275986, a generator has a self-excited field winding and the field current is on/off controlled by a power transistor.

In this prior art, however, the output current of the generator is supplied to excite the generator itself and therefore when the power transistor changes from on-state to off-state or vice versa to control the exciting current, the output current changes considerably. As a result, a counter electromotive force due to that change in the output current takes place in the armature winding, causing a spike voltage which is superimposed on the output voltage and transmitted to various on-board electrical loads. Especially where the spike voltage is transmitted, directly or in the form of an electric wave, to such a communication device as an on-board radio receiver, the radio receiver is adversely affected by radio or communication noises. The noises, known as the switching noise of the generator, have hitherto been recognized as problematic in a vehicle carrying various communication devices but considered unavoidable in the switching type voltage regulator.

SUMMARY OF THE INVENTION

An object of this invention is to provide a semiconductor type voltage regulator for charger/generator especially having the overall circuit suitable to be formed on a one-chip monolithic IC, in which an initial excitation signal of a desired duty ratio can be generated without resort to adjustment and in which a switching element connected to the high potential side of the field winding can readily be driven by a high voltage generated from a booster which is driven, in common with an initial excitation signal generator circuit, by means of a single oscillator.

A second object of this invention is to provide a semiconductor type voltage regulator for generator which can minimize the switching noise.

According to the invention, the first object can be accomplished by a voltage regulator featured by the provision of an oscillator for generating an oscillation signal of a desired duty ratio; an initial excitation signal generator circuit having a plurality of stages of frequency dividers for dividing the frequency of the oscillation signal generated from the oscillator and combining together frequency division signals of the frequency dividers to produce a synthesized output signal of a desired duty ratio; a booster for boosting and rectifying an AC signal containing the oscillation signal of the oscillator and a signal which is opposite in phase to the oscillation signal to provide a boosted output signal; and excitation control means being operative, when a generator is in non-generation condition, to apply the oscillation signal of the oscillator to the booster in synchronism with the output signal of the initial excitation signal generator circuit so as to cause the booster output signal corresponding to the output signal of the initial excitation signal generator circuit to on/off control a switching element connected between a battery and the field winding of the generator to thereby effect initial excitation of the generator and being operative, when the generator is in a predetermined generation condition, to respond to an output signal of a voltage detector circuit for detection of voltage of the battery so as to control the application of the oscillation signal to the booster to thereby on/off control the switching element in dependence on the battery voltage.

Figure 3:
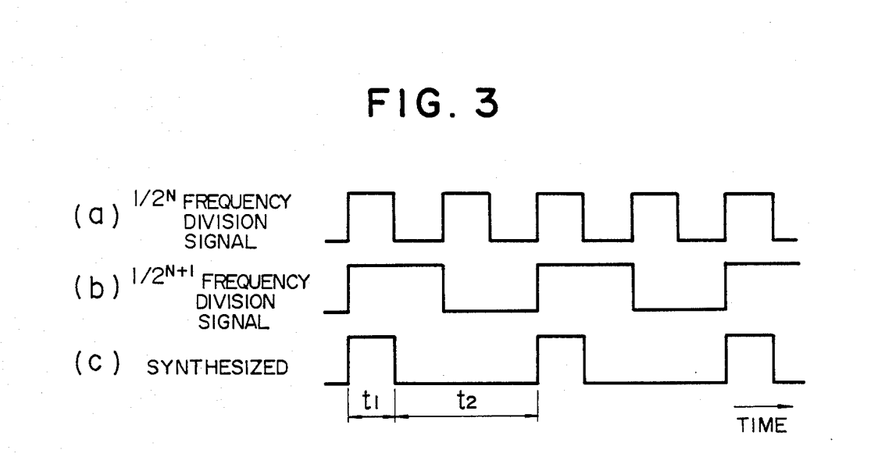
FIG. 3 is a time chart illustrating signal waveforms useful to explain the operation of the initial excitation signal generator circuit.

In the initial excitation signal generator circuit, the oscillation signal having the desired duty ratio is frequency-divided by mean of the plurality of stages of frequency dividers and frequency division signals of the dividers are logically combined together to provide a synthesized pulse signal of a desired duty ratio, as exemplified in FIG. 3 by taking production of a synthesized signal of ¼ duty ratio, for instance. Since the duty ratio of the synthesized signal is constant irrespective of values of resistor and capacitor in the oscillator, the initial excitation signal of a desired duty ratio can be generated without resort to adjustment.

In the booster, the high frequency AC signal containing the oscillator oscillation signal and the signal which is opposite in phase to the oscillation signal is boosted and rectified by means of capacitors and diodes to produce a voltage boosted sufficiently for driving the switching element such as a power MOS-FET connected to the high potential side of the field winding. Accordingly, when the generator is in non-generation condition, the oscillation signal of the oscillator is applied to the booster in synchronism with the output signal of the initial excitation signal generator circuit so that the switching element can be on/off controlled at the desired duty ratio of the synthesized signal to pass a limited initial exciting current to the field winding of the generator. When the generator is in a predetermined generation condition, the application of the oscillation signal to the booster is controlled by the output signal of the voltage detector circuit for detection of the battery voltage so that the switching element can be on/off controlled in dependence on the battery voltage to perform normal voltage regulation operation. In this manner, the single oscillator can drive the initial excitation signal generator circuit and booster in common in order to drive the exciting current on/off switching element with high voltage.

According to the invention, the second object can be accomplished by using a current detector for detecting conduction current flowing through a switching power element and a slope generator circuit for generating a ramp signal which changes with time at a constant slope, to perform feedback control such that the conduction current detected by the current detector has the same waveform as that of the ramp signal generated from the slope generator circuit.

Generally, a counter electromotive force generated in a winding of an inductance of L on account of a change in current I flowing through the winding is given by $$E = -L \cdot dI/dt \quad (1).$$

In the conventional apparatus, because of abrupt switching, a change with time in the current as indicated by dI/dt is theoretically infinite and E has a very large value. Contravily, with the above construction, as the power element changes from on-state to off-state or vice versa, the current I changes at the constant slope to control dI/dt to a predetermined value and no excessive counter electromotive force is generated.

DESCRIPTION OF THE PREFERRED EMBODIMENTS

The invention will now be described by way of example with reference to the accompanying drawings.

Figure 1:
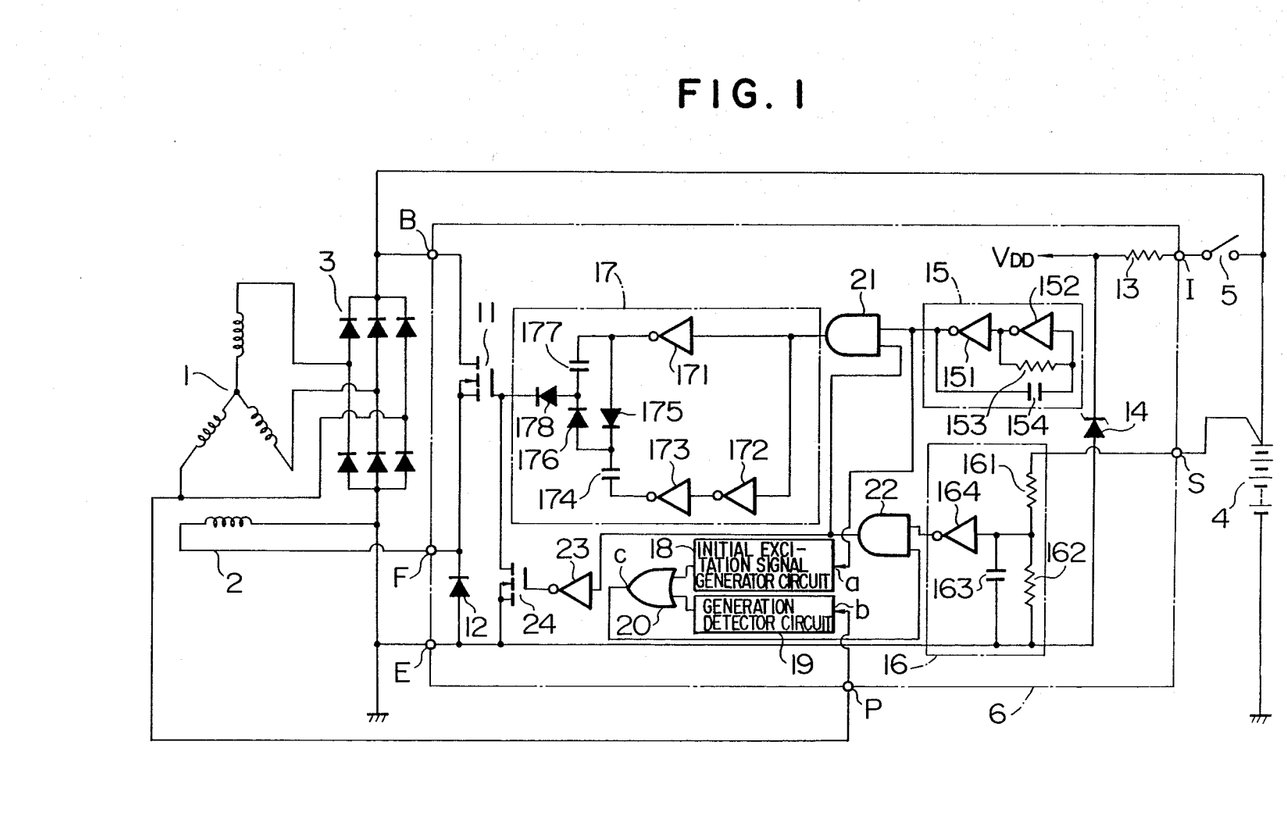
FIG. 1 is a circuit diagram showing the overall construction of a voltage regulator for charger/generator according to an embodiment of the invention.

FIG. 1 is a circuit diagram showing the overall construction of a voltage regulator for charger/generator according to an embodiment of the invention. Referring to FIG. 1, a generator driven by an engine (not shown) has an armature winding 1 in three-phase star connection. A field winding 2 generates field flux, a three-phase full-wave rectifier 3 converts a three-phase AC output waveform of the armature winding 1 into a DC output waveform, and a battery 4 is on the one hand charged with the rectified DC output waveform from the three-phase full-wave rectifier 3 and on the other hand it supplies power to external loads (not shown). A key switch 5 is turned in upon start of the engine to supply power to an ignition unit (not shown). A voltage regulator 6 characteristic of the present invention comprises a constant voltage circuit including an N-channel power MOS-FET 11 serving as a main switching element, a fly-wheel diode 12, a resistor 13 and a Zener diode 14, an oscillator 15 including NOT gates 151 and 152, a resistor 153 and a capacitor 154, a voltage detector 16 including dividing resistors 161 and 162, a capacitor 163 and a NOT gate 164, a booster 17 including NOT gates 171, 172 and 173, capacitors 174 and 177 and diodes 175, 176 and 178, an initial excitation signal generator circuit 18, a generation detector circuit 19 serving as an excitation control means, and such other elements as an OR gate 20, AND gates 21 and 22, a NOT gate 23 and an N-channel MOS-FET 24 serving as an auxiliary switching element.

The power MOS-FET 11 is connected between a terminal B on the output side of the generator and a terminal F on the high potential side of the field winding 2 and when rendered conductive, it passes an exciting current to the field winding 2. The fly-wheel diode 12 is connected between the terminal F and a terminal E (ground) and operative to pass a fly-wheel current of the field winding 2. The MOS-FET 24 is connected between the gate of power MOS-FET 11 and the terminal E and when rendered conductive, it discharges an electric charge accumulated in the gate of the power MOS-FET 11. In the constant voltage circuit, one end of the resistor 13 is connected to the key switch 5 through a terminal I and in the voltage detector circuit 16, the dividing resistors 161 and 162 are connected between a terminal S and the terminal E so as to divide a battery voltage supplied to the circuit 16 through the terminal S. The generation detector circuit 19 has its input terminal b connected to receive a generation voltage from the armature winding 1 through a terminal P.

Figure 2:
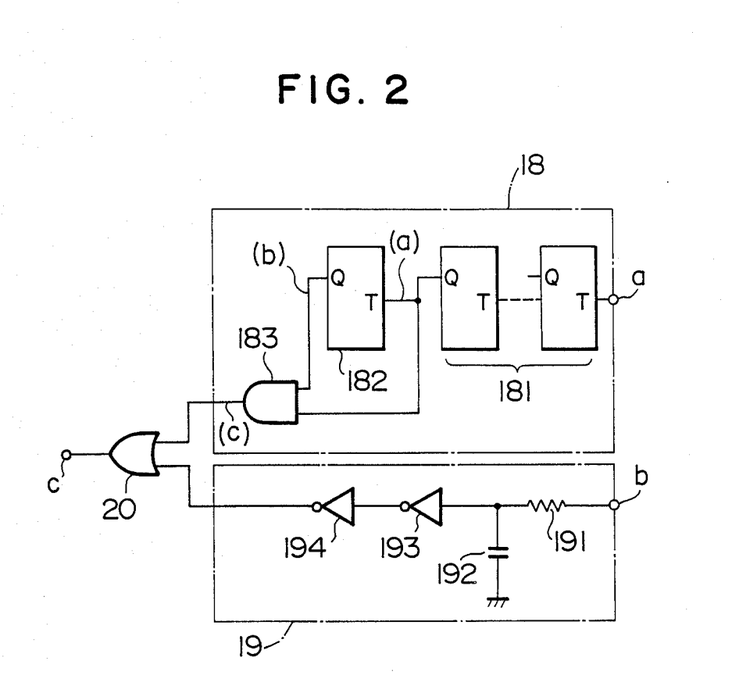
FIG. 2 is a detailed circuit diagram showing an initial excitation signal generator circuit and a generation detector circuit used in the FIG. 1 circuit.

The initial excitation signal generator circuit 18 and generation detector circuit 19, both shown in block form in FIG. 1, are detailed in FIG. 2. The initial excitation signal generator 18 includes a frequency divider 181 having N stages of T-type flip-flop connected in series, a T-type flip-flop 182 constituting an (N+1)th stage frequency divider and an AND gate 183, and the generation detector circuit 19 is comprised of a resistor 191, a capacitor 192 and NOT gates 193 and 194.

The output of the AND gate 183 included in the initial excitation signal generator circuit 18 is connected to one input of the OR gate 20 and the output of the NOT gate 194 included in the generation detector circuit 19 is connected to the other input.

The operation of the voltage regulator constructed as above will now be described. When the engine of a car remains stopped, the key switch 5 is first turned in so that a constant voltage $V_{DD}$ develops across the Zener diode 14 fed from the battery 4 through the resistor 13, the constant voltage being the power supply voltage applied to individual logical gates. Then, the oscillator 15 starts to oscillate at a period determined by the resistor 153 and capacitor 154. The oscillation signal has a desired duty ratio, for example, ½. The oscillation signal generated from the oscillator 15 is applied to the input terminal, a, of the initial excitation signal generator circuit 18. As will be seen from FIG. 2, the frequency of the oscillation signal applied to the terminal a is $\frac{1}{2}^N$ divided at the frequency divider 181 to provide a frequency division signal waveform as illustrated at section (a) in FIG. 3. This signal waveform is ½ divided further at the T-type flip-flop 182 to provide a signal waveform as illustrated at section (b) in FIG. 3. The former and latter signal waveforms are ANDed together at the AND gate 183 to provide an output signal of a waveform as illustrated at section (c) in FIG. 3. In this output signal, pulse-off duration $t_2$ is three times pulse-on duration $t_1$ and the duty ratio D is given by $$D = t_1/(t_1 + t_2) = ¼.$$

This value of duty ratio D is regardless of values of the resistor 153 an capacitor 154 of the oscillator 15.

In this phase of operation, the generator stops generating and no voltage develops in the armature winding 1. Consequently, the terminal P of the voltage regulator 6 receives no voltage, with the input signal at terminal b of the FIG. 2 generation detector circuit 19 rendered "0" level, the output signal of the NOT gate 193 rendered "1" level and the output signal of the NOT gate 194 rendered "0" level. This "0" level output signal of the NOT gate 194 is applied to the OR gate 20 which in turn produces on its output terminal or terminal c the signal waveform at (c) in FIG. 3 without alternation.

On the other hand the battery 4 is not charged yet having its terminal voltage at the terminal S which does not reach a prescribed value (normally about 14.5 volts) and consequently the division voltage from the dividing resistors 161 and 162 of the voltage detector 16 does not reach a threshold of the NOT gate 164, with the output signal of the NOT gate 164 rendered "1" level. This "1" level output signal is applied to one input of the AND gate 22. Since the other input of the AND gate 22 is connected to the terminal c, an output signal delivered out of the AND gate 22 coincides with the output signal at terminal c having the waveform shown at(c) in FIG. 3 and is applied, together with the oscillation signal of the oscillator 15, to the AND gate 21.

Assuming the $V_{DD}$ being 10 volts, the operation of the circuit subsequent to the AND gate 21 will now be described in accordance with "1" and "0" modes of the output signal of the AND gate 22.

(i) In the mode of the output signal of AND gate 22 being "1".

The output signal of the AND gate 21 coincides with the oscillation signal of the oscillator 15 and is sent to the booster 17. In this booster, output signals of the NOT gates 171 and 173 are in opposite phases and the oscillation signal voltage can be boosted through the following operation.

At an instant that the output signal of NOT gate 171 is "1" level and the output signal of NOT gate 173 is "0" level, the capacitor 174 is charged with the voltage and its terminal voltage reaches 10 volts after the lapse of predetermined time. Subsequently, as the phases are inverted rendering the output signal of NOT gate 173 "1" level and the output signal of NOT gate 171 "0" level, the anode voltage of the diode 176 becomes 10+10=20 (volts) and the electric charge stored in th capacitor 174 is transferred to the capacitor 177 through the diode 176. As a result of the transfer of the electric change, the capacitor 177 is charged to provide a terminal voltage which is higher than at least 10 volts, though dependent upon a capacitance ratio between the capacitors 174 and 177. Thereafter, as the phases are again inverted rendering the output signal of NOT gate 171 "1" level, the anode voltage of the diode 178 exceeds 20 volts, causing electric charge to transfer to the gate of the power MOS-FET 11 through the diode 178.

Consequently, the power MOS-FET 11 is applied across its gate and source with a voltage in excess of its threshold and rendered conductive.

(ii) In the mode of the output signal of AND gate 22 being "0". Since the output signal of AND gate 21 is rendered "0" level and the output signal of the oscillator 15 is not transmitted to the booster 17, the boosting effect is overridden. On the other hand, the output signal of the NOT gate 23 is rendered "1" level to turn on the MOS-FET 24, with the result that the electric charge stored in the gate of the power MOS-FET 11 is discharged, turning off the power MOS-FET 11.

Through the above operation, the power MOS-FET 11 is reiteratively turned on and off in synchronism with the waveform at (c) in FIG. 3 and under this condition, current having a value restricted to ¼ of the maximum current keeps flowing through the field winding 2.

Subsequently, as the engine starts to rotate, a voltage is generated in the armature winding 1 and applied to the terminal b of the generation detector circuit 19 through the terminal P. As the mean value of the voltage exceeds a predetermined value, the output signal of NOT gate 193 is rendered "0" level and the output signal of NOT gate 194 is rendered "1" level, thus maintaining the output signal of OR gate 20 at "1" level and the transmission of the ¼ duty-ratio output signal of the initial excitation signal generator circuit 18 is overridden. Accordingly, the output signal of the AND gate 22 is conditioned by the output signal of the NOT gate 164.

When the voltage of the battery 4 is low, the output signal of NOT gate 164 is rendered "1" level and this "1" level signal is passed through the AND gate 22 to reach the AND gate 21, so that the oscillation signal of the oscillator 15 is applied to the booster 17 and the power MOS-FET 11 is maintained to be conductive. As a result, the amount of current flowing through the field winding 2 is increased to raise voltage generated in the armature winding 1, thereby raising the voltage of the battery 4. Subsequently, as the voltage of the battery 4 exceeds the prescribed value, the output signal of the NOT gate 164 is inverted to "0" level, rendering the output signal of AND gate 22 "0" level and the output signal of AND gate 21 "0" level and as a result, the transmission of the oscillation signal of oscillator 15 to the booster 17 is overridden and the thus overridden boosting effect turns off the power MOS-FET 11, causing the current flowing in the field winding to damp through the fly-wheel diode 12. It follows therefore that the generated voltage is decreased to lower the voltage of the battery 4. The above operation repeats itself to perform voltage regulation for the battery 4.

In accordance with the present embodiment, the ¼ duty-ratio signal necessary for the initial excitation can be generated in adjustless fashion without the need for trimming of the resistor and capacitor of the oscillator and therefore the power MOS-FET 11 can be incorporated in the digital circuit to form a voltage regulator on one chip. Further, the single oscillator is operative to drive the initial excitation signal generator circuit and booster in common and this is effective to minimize the manufacture cost.

In the foregoing embodiment, the duty ratio is designed to be ¼ but the output signal of a desired duty ratio can be obtained by varying the division ratio of the oscillation signal and performing the combination logic.

In the previously-described voltage regulator according to the invention, when the generator is in non-generation condition, the initial excitation current to be passed through the field winding is so limited as to prevent overdischarge caused by inadvertently keeping the key switch turned in and besides, the switching element for switching on and off the excitation current is connected to the high potential side of the field winding and can be driven by the high voltage to thereby ensure that leakage current due to salty substance deposited on the generator rotor can be suppressed to prevent electrolytic corrosion.

In addition, the switching element can be on/off controlled at the desired duty ratio by means of the digital circuit in order to carry out the initial excitation whereby the need for adjustment by, for example, trimming during manufacture can be eliminated, and the single oscillator can be used to drive the initial excitation signal generator circuit and booster in common to thereby reduce the manufacture cost. The adjustless advantage permits the voltage regulator to be formed on a one-chip monolithic IC, thereby realizing compactness of apparatus.

Figure 4:
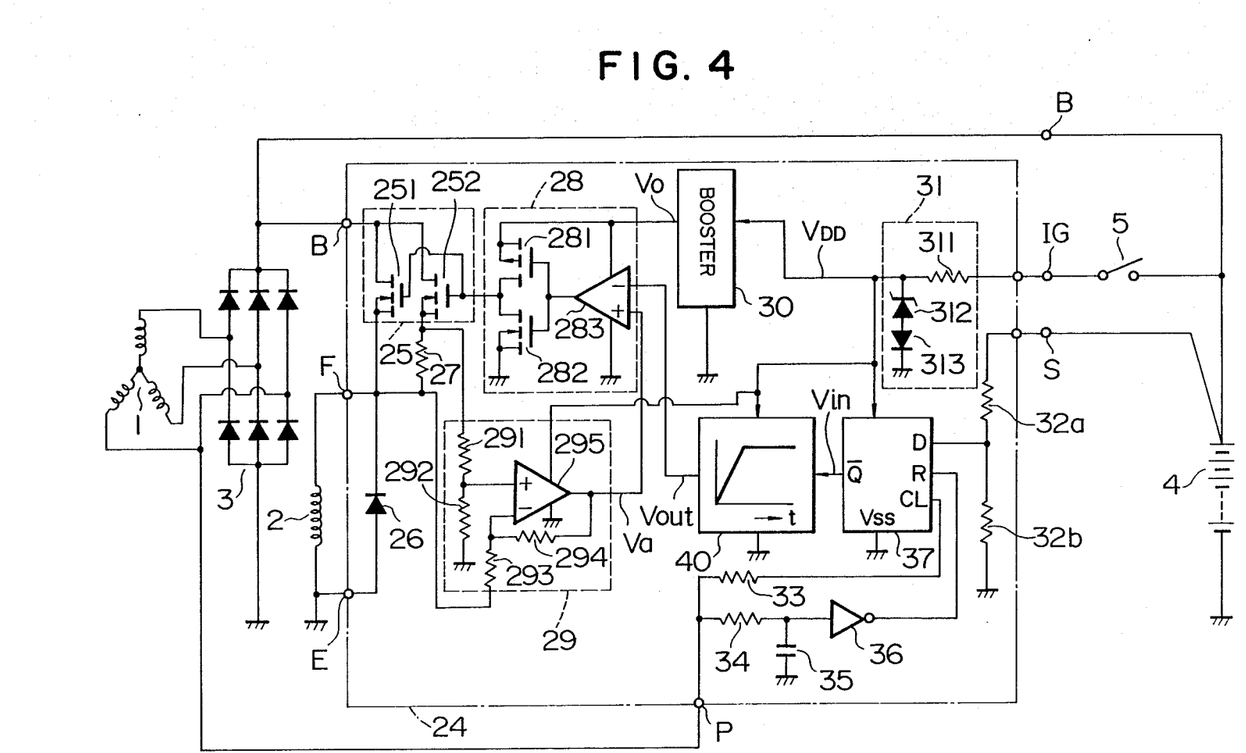
FIG. 4 is a circuit diagram showing the overall construction of a voltage regulator according to another embodiment of the invention.

Another embodiment of the invention will now be described. FIG. 4 is a circuit diagram illustrating a car on-board generator system according to this embodiment of the invention. Referring to FIG. 4, the generator system supplies current to a battery 4 and electrical loads (not shown) and incorporates an armature winding 1 in three-phase star connection, a three-phase full-wave rectifier 3 for converting a three-phase AC output waveform into a DC waveform, a field winding 2 excited to supply magnetic flux to the armature winding 1 and a voltage regulator 24 for controlling current passed through the field winding 2.

The voltage regulator 24 comprises an N-channel power MOS-FET 25 including a main transistor 251 and a current detection transistor 252, a diode 26 for suppressing fly-back voltage of the field winding 2, a current detection resistor 27, an amplifier 28 including an operational amplifier 283 whose output is connected to a complementary connection of P-channel MOS-FET 281 and N-channel MOS-FET 282, a differential amplifier 29 comprised of resistors 291, 292, 293 and 294 and an operational amplifier 295, a booster 30, a constant voltage circuit 31 comprised of a resistor 311, a Zener diode 312 and a diode 313, a D-type flip-flop 37, a slope generator circuit 40, and other elements such as dividing resistors 32a and 32b, resistors 33 and 34, capacitor 35 and NOT gate 36.

Figure 5:
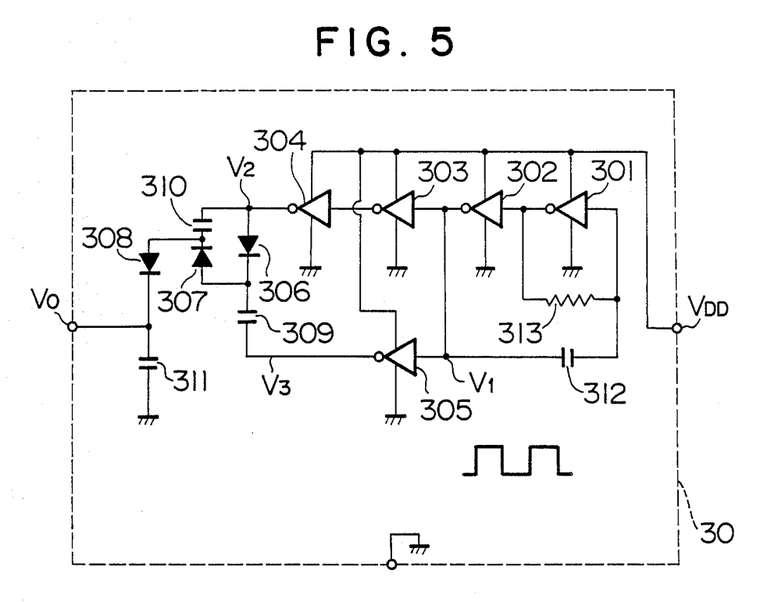
FIG. 5 is a circuit diagram of a booster in FIG. 4.

FIG. 5 illustrates the internal circuit construction of the booster 30 in FIG. 4. As shown, the booster 30 includes NOT gates 301, 302, 303, 304 and 305 in the form of a C-MOS, diodes 306, 307 and 308, capacitors 309, 310, 311 and 312, and a resistor 313.

Figure 6:
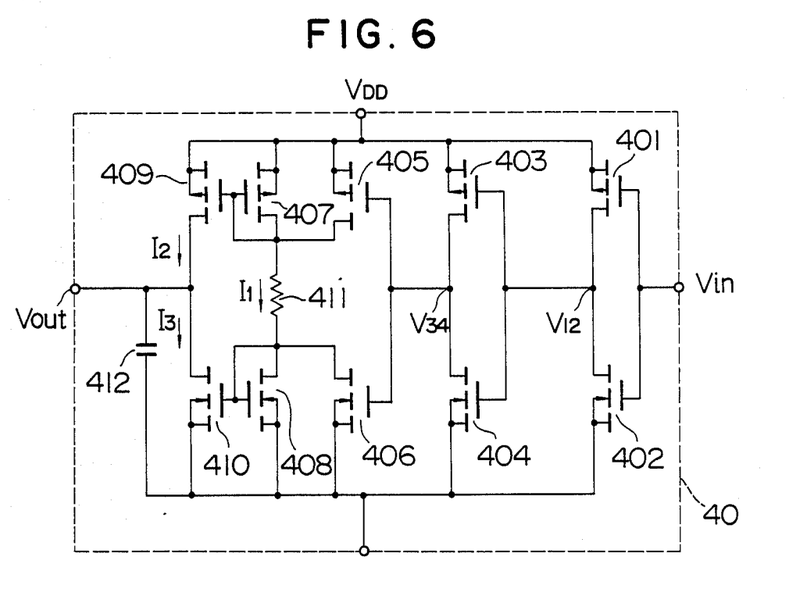
FIG. 6 is a circuit diagram of a slope generator circuit in FIG. 4.

FIG. 6 illustrates the internal circuit construction of the slope generator circuit 40 in FIG. 4. As shown, the slope generator circuit 40 includes P-channel MOS-FET's 401, 403, 405, 407 and 409, N-channel MOS-FET's 402, 404, 406, 408 and 410, a resistor 411 and a capacitor 412.

The generator constructed as above operates as will be described below. Returning to FIG. 4, when a key switch 5 is first turned in and the battery 4 feeds the constant voltage circuit 31, a constant voltage $V_{DD}$ develops across the Zener diode 312 and diode 313, the constant voltage being used as power supply voltage applied to individual circuits.

In the booster 30 shown in FIG. 5, a circuit comprised of the NOT gates 301 and 302, capacitor 312 and resistor 313 is a well-known oscillator which generates an oscillation output signal $V_1$ of rectangular waveform having a frequency in dependence on a time constant determined by the capacitor 312 and resistor 313. The NOT gates 303, 304 and 305 constitutes a buffer gate in which an output signal $V_2$ delivered out of the NOT gate 304 is in phase with the oscillation signal $V_1$ and an output signal $V_3$ delivered out of the NOT gate 305 has the inverted phase with respect to the oscillation signal $V_1$. At an instant that $V_2 =$ "1" and $V_3 =$ "0" stand, the capacitor 309 is charged with an electric charge through the diode 306 to assume a voltage corresponding to the constant voltage $V_{DD}$ when neglecting the forward voltage drop in the diode 306. At a subsequent instant that the inverted relationship of $V_2 =$ "0" and $V_3 =$ "1" stands, the anode voltage of diode 307 approximates $2 \cdot V_{DD}$ and the electric charge is permitted to be transferred to the capacitor 310. Consequently, the capacitor 310 is charged to assume its terminal voltage of $2 \cdot V_{DD}$. At further subsequent instant that the inverted relationship of $V_2 =$ "1" and $V_3 =$ "0" stands, the anode voltage of diode 308 approximates $3 \cdot V_{DD}$ and the capacitor 311 is charged through the diode 308 to assume its terminal voltage of $3 \cdot V_{DD}$. Through the above operation, an output voltage $V_0$ higher than the power supply voltage $V_{DD}$ can be obtained.

Figure 7:
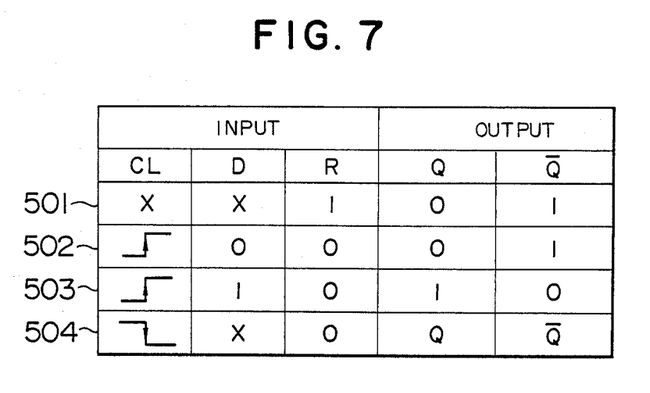
FIG. 7 is a truth table of a D-type flip-flop in FIG. 4.

To describe the operation of the D-type flip-flop 37, reference should be made to its truth table as shown in FIG. 7. Input signals to terminals CL, D and R of the D-type flip-flop 37 change in accordance with four modes 501 to 504. In mode 501 wherein the terminal R (reset) assumes "1", the output is unconditionally reset and Q=0 or $\overline{Q}$=1 stands. In modes 502 and 503 wherein the terminal CL (clock) changes from "0" to "1", a value at the terminal D is transmitted without alternation to the output and maintained as Q. In mode 504 wherein the terminal CL falls, the output does not change. In FIG. 7, a "X" mark represents any of "0" and "1".

In this embodiment, a one-phase signal in the armature winding 1 is connected to a terminal P, and it is on the one hand used as a clock signal applied to the terminal CLK of the D-type flip-flop 37 and on the other hand smoothed and inverted so as to be applied to the terminal R. Accordingly, when the generator stops generating, the NOT gate 3 is applied with the "0" input signal and produces the "1" output signal which in turn resets the D-type flip-flop 37.

To explain the slope generator circuit 40, reference should be made to FIG. 6. At an instant that there is no charge on the capacitor 412 and an input voltage Vin rises from "0" to "1", the P-channel MOS-FET 401 is rendered off and the N-channel MOS-FET 402 rendered on to provide an output voltage $V_{12}$ of "0". This renders the P-channel MOS-FET 403 on and the N-channel MOS-FET 404 off, providing an output signal $V_{34}$ of "1" which renders the P-channel MOS-FET 405 off and the N-channel MOS-FET 406 on. With the N-channel MOS-FET 406 rendered on, the N-channel MOS-FET's 408 and 410 are rendered off. The P-channel MOS-FET's 407 and 409 are then activated to constitute a current mirror circuit which prescribes that $I_1=I_2$ stands. Where the resistance of the resistor 411 is $R_1$ and the threshold voltage of the P-channel MOS-FET 407 is Vth, $$I_1 = (V_{DD} - Vth)/R_1 \quad (2)$$

stands, indicating that because of $V_{DD}$ being constant, $I_1$ is a constant current. Accordingly, $I_2$ is also the constant current and voltage charge on the capacitor 412 increases in proportion to time. More particularly, when describing capacitor charging in general, a capacitor of capacitance C is charged with current I over time t to assume electrostatic charge Q or voltage V as follows:

$$V = Q/C \quad (3)$$

and
$$Q = \int Idt \quad (4)$$

and so, there results $$V = (I/C) \cdot \int Idt \quad (5)$$

Then, by applying equation (5) to the particular case of FIG. 6 where the constant current $I_2$ substitutes for I, $$V_{out} = I_2 \cdot t/C \quad (6)$$

can be obtained which indicates that the output voltage thus generated is in proportion to the lapse of time t. When the output voltage $V_{out}$ reaches $V_{DD}$, no current is additionally supplied add the output voltage is saturated. In this manner, a rising ramp voltage with a constant slope as indicated in the block of slope generator circuit 40 shown in FIG. 1 can be generated from the circuit 40.

Conversely, when the input voltage $V_{in}$ falls from "1" to "0", the operation is converse to the above operation whereby the P-channel MOS-FET 409 is rendered off and the N-channel MOS-FET 410 is rendered on, so that a constant current $I_3$ is permitted to flow by which the capacitor 412 discharges and the $V_{out}$ decreases at a constant slope until 0 (zero) volt at which the voltage is saturated. Through the above operations, the slope generator circuit 40 responds to the rise and fall of the input voltage to generate the increasing and decreasing ramp output voltages with constant slopes.

To describe the operation of the power MOS-FET 25, this power MOS-FET is formed of a number of cells connected in parallel and currents flow uniformly through individual cells. Accordingly, a current proportional to the cell area ratio is drawn from the power MOS-FET and a voltage proportional to the main current develops across the resistor 27. This technique is known from, for example, U.S. Pat. No. 4,553,084.

The differential amplifier 29 differentially amplifies the voltage developing across the resistor 27 to produce a voltage Va which is proportional to the current flowing through the power MOS-FET 25. The current in the power MOS-FET 25 is controlled by the amplifier 28 in the following manner.

Firstly, when the amount of current flowing through the power MOS-FET 25 is small, the voltage Va is also low and the operational amplifier 283 produces a low output signal. Under this condition, the P-channel MOS-FET 281 is rendered on to permit the electric charge to transfer from the output, $V_0$, of the booster 30 to the gate of the power MOS-FET 25. As the gate voltage of the power MOS-FET 25 becomes higher, the conduction current flowing through the power MOS-FET 25 increases. With the conduction current in the power MOS-FET 25 increased to some extent, the output voltage $V_a$ of the differential amplifier 29 exceeds $V_{out}$, so that the differential amplifier 283 is permitted to produce a high output voltage by which the P-channel MOS-FET 281 is rendered off and the N-channel MOS-FET 282 rendered on to discharge the electric charge in the gate of the power MOS-FET 25, thereby decreasing the conduction current in the power MOS-FET 25.

In accordance with the above operation, the current flowing through the power MOS-FET 25 is so controlled as to follow the output voltage $V_{out}$ of the slope generator circuit 40. When the generator stops generating, $V_{in}=$ "1" and $V_{out}=V_{DD}$ are maintained and hence the power MOS-FET 25 is rendered fully conductive to excite the field winding 2. As the rotation speed of the generator increases, AC voltage is generated in the armature winding 1 and the mean value of voltage at the terminal P increases, rendering the output signal of the NOT gate 36 "0" level. On the other hand, if the input voltage to the terminal D of D-type flip-flop 37, that is, the division of the battery voltage is above the predetermined value when the voltge developing at the terminal P rises, the $\overline{Q}$ output signal is rendered "0" and the output voltage $V_{out}$ of the slope generator circuit 40 decreases at the constant negative slope. As the voltage $V_{out}$ decreases, the field current flowing through the power MOS-FET 25 also decreases to lower the generated voltage and consequently the voltage of the battery 4. When under the thus lowered level of the voltage of battery 4 the clock signal supplied to the terminal CL through the terminal P rises, the $\overline{Q}$ output of the D-type flip-flop 37 is inverted to "1" and the output voltage $V_{out}$ of the slope generator circuit 40 increases at the positive slope. Consequently, the field current increases, the output voltage of the generator increases and the voltage of battery 4 increases. The above operation repeats itself to regulate the voltage of battery 4 to the predetermined level. The level to which the battery voltage is regulated is determined by the threshold voltage for the terminal D of D-type flip-flop and the division ratio defined by the resistors 32a and 32b.

Figure 8:
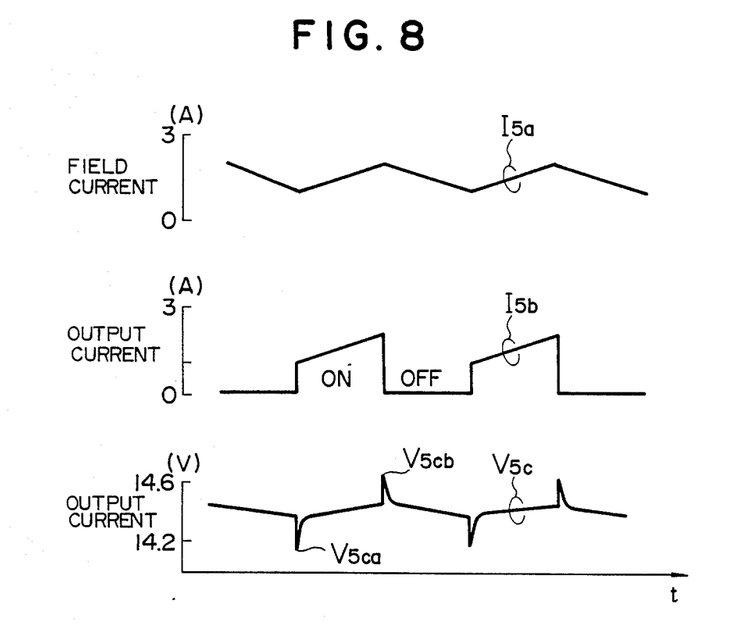
FIG. 8 is a waveform diagram useful to explain the generation operation of a prior art apparatus.
Figure 9:
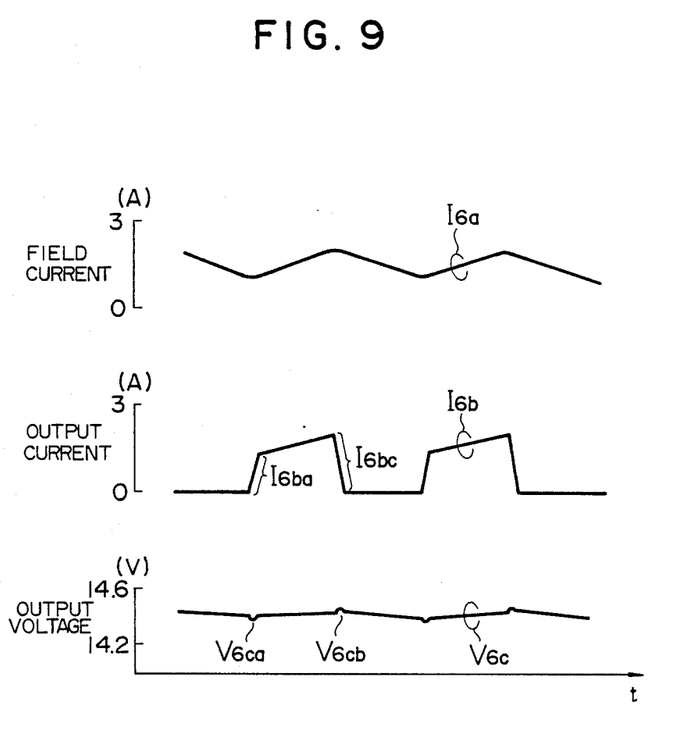
FIG. 9 is a waveform diagram useful to explain the generation operation in the FIG. 4 circuit.

FIG. 8 is a time chart illustrating operation waveforms appearing in the prior art apparatus and Fig. 9 is a time chart illustrating operation waveforms appearing in the above embodiment of the invention. In FIG. 8, while field current $I_{5a}$ flowing through the field winding 2 changes continuously under the influence of the diode 26, exciting current $I_{5b}$ supplied through the power MOS-FET 25 to the armature winding 1 of the generator becomes discrete when the power MOS-FET 25 changes from on-state to off-state or vice versa, causing spike voltages $V_{5ca}$ and $V_{5cb}$ to appear on the output voltage $V_{5c}$.

Contrarily, in FIG. 9, output current $I_{6b}$ has rise and fall portions $I_{6ba}$ and $I_{6bc}$ which are more gradually inclined under the influence of the slope generator circuit 30, attaining an advantage that spike voltages $V_{6ca}$ and $V_{6cb}$ appearing on the output voltage $V_{6c}$ of the generator can be suppressed.

In the present embodiment, the power MOS-FET is used as the power element to minimize power loss during normal operation. This minimized power loss is added to a large amount of heat generated by signals passing through active elements during switching of the power element, so that the total power loss can be decreased and is comparable to that in the prior art apparatus.

Further, since in the present embodiment the D-type flip-flop ensures that the switching of the power element can be effected in synchronism with the rise of the output voltage in the three-phase armature winding 1, that is, in synchronism with the switching of the three-phase AC voltage or the bottom or valley of ripples on the rectified output voltage, the value of dI/dt in equation (1) can be minimized to extremely efficiently reduce electric wave interference such as noises affecting on-board radio receivers.

As described above, the semiconductor type voltage regulator for generator according to this embodiment of the invention can minimize the switching noise to prevent noise interference with on-board ratio receivers, television receiver sets and communication devices such as can telephones and transceivers, thereby improving the amenities of cars and reliability of communication systems.

We claim:

1. A voltage regulator for charger/generator comprising:
   a switching element, connected between a battery and a field winding of a generator adapted to charge said battery, for switching on and off an exciting current flowing through said field winding;
   a voltage detector responsive to voltage of said battery to control the operation of said switching element;
   an oscillator for generating an oscillation signal of a desired duty ratio;
   an initial excitation signal generator circuit having a plurality of stages of frequency dividers for dividing the frequency of the oscillation signal generated from said oscillator and combining together frequency division signals of said frequency dividers to produce a synthesized output signal of a desired duty ratio;
   a booster for boosting and rectifying an AC signal containing the oscillation signal of said oscillator and a signal which is opposite in phase to the oscillation signal to provide a boosted output signal; and
   excitation control means being operative, when said generator is in non-generation condition, to apply the oscillation signal of said oscillator to said booster in synchronism with the output signal of said initial excitation signal generator circuit so as to cause the booster output signal corresponding to the output signal of said initial excitation signal generator circuit to on/off control said switching element to thereby effect initial excitation of said generator and being operative, when said generator is in a predetermined generation condition, to respond to an output signal of said voltage detector so as to control the application of the oscillation signal to said booster to thereby on/off control said switching element in dependence on the battery voltage.

2. A voltage regulator for charger/generator comprising:
   a power element for switching on and off an exciting current supplied to a field winding of a generator;
   means for producing an off-signal which is used to switch off said power element when the output voltage of said generator exceeds a predetermined value and an on-signal which is used to switch on said power element when the output voltage of said generator does not exceed said predetermined value, to effect control such that the output voltage of said generator can be constant;
   a slope generator circuit responsive to the on-signal or the off-signal delivered out of said control means to provide a ramp voltage signal which rises or falls at predetermined slopes;
   a current detector for detecting the current flowing through said power element; and
   an operation circuit responsive to a difference between a detection output signal of said current detector and the ramp voltage signal of said slope generator circuit to effect control such that the current in said power element rises or falls at the same slopes as those of the ramp voltage.

* * * * *